United States Patent [19]
Henry, Jr.

[11] Patent Number: 5,991,622
[45] Date of Patent: Nov. 23, 1999

[54] METHOD AND APPARATUS FOR AUTOMATIC CHANNEL MEASUREMENTS

[75] Inventor: Raymond C. Henry, Jr., Wake Forest, N.C.

[73] Assignee: Ericsson Inc., Research Triangle Park, N.C.

[21] Appl. No.: 08/916,848

[22] Filed: Aug. 22, 1997

[51] Int. Cl.$^6$ .............................. H04Q 7/20; H04B 1/18; H04B 17/00

[52] U.S. Cl. ......................... 455/434; 455/513; 455/67.1; 455/226.1; 455/226.2; 455/186.1; 455/165.1; 455/161.2; 455/161.3; 455/179.1; 455/185.1

[58] Field of Search ................................. 455/67.1, 455, 455/450–452, 165.1, 183.1, 185.1, 186.1, 464, 509, 513, 515, 516, 176.1, 179.1, 180.1, 226.1, 226.2, 260, 266, 434, 161.1–161.3

[56] References Cited

U.S. PATENT DOCUMENTS

| | | | |
|---|---|---|---|
| 4,179,662 | 12/1979 | Pflasterer | 325/470 |
| 4,236,251 | 11/1980 | Ohgishi et al. | 455/180 |
| 4,403,342 | 9/1983 | Borras et al. | 455/186.1 |
| 4,905,301 | 2/1990 | Krolopp et al. | 455/455 |
| 5,448,762 | 9/1995 | Ward | 455/67.1 |
| 5,483,684 | 1/1996 | Ono et al. | 455/161.2 |
| 5,825,757 | 10/1998 | Tat et al. | 370/330 |
| 5,877,701 | 3/1999 | Nagakura | 455/165.1 |
| 5,907,806 | 5/1999 | Yamada et al. | 455/186.1 |

FOREIGN PATENT DOCUMENTS

| | | |
|---|---|---|
| 0 283 955 | 9/1988 | European Pat. Off. . |
| 2 277 424 | 10/1994 | United Kingdom . |

OTHER PUBLICATIONS

PCS IS–136 Based Air Interface Compatibility 1900 MHz Standard, PN3388–1, Feb. 10, 1995 Ballot Version, pp. 109–110, 141–142 and 155–156.

*Primary Examiner*—William G. Trost
*Assistant Examiner*—Tracy M. Legree
*Attorney, Agent, or Firm*—Jenkens & Gilchrist, P.C.

[57] ABSTRACT

A mobile station for measuring signal strength of a set of channels includes a synthesizer, a controller and a transceiver. During an idle period, the controller loads channel data of the set of channels contained into a memory block in the synthesizer. The synthesizer automatically selects the channel data for each channel stored in the memory block and generates a frequency signal corresponding to the selected channel data. The transceiver measures the signal strength data of the selected channel data and stores the signal strength data in a buffer. Once the signal strength data for the entire set of channels has been measured and stored in the buffer, the transceiver transmits the signal strength data to the controller. The set of channels may include a set of channels from a neighbor cell list or measurement order transmitted by the radio base station. The set of channels may also include a set of control channels that the mobile station measures at power-up.

21 Claims, 10 Drawing Sheets

METHOD AND APPARATUS FOR AUTOMATIC CHANNEL MEASUREMENTS

BACKGROUND OF THE INVENTION

1. Technical Field of the Invention

This invention relates to wireless communication devices, and more particularly to a mobile station that more efficiently measures signal strength of a set of channels in a wireless communications system.

2. Background of the Invention

FIG. 1 illustrates a typical wireless communications system 2. A plurality of mobile stations (MS) 10 are located in a geographical service area covered by cells C1 through C6. Radio base stations (RBS) 4 are positioned within the geographic area covered by the cells C1 through C6 and act as an interface between the mobile station 10 and the wireless communications system 2.

The radio base stations 4 are connected by a dedicated wireline to a mobile telephone switching office (MTSO) 6, also known as a mobile service switching center in certain wireless communications systems. The MTSO 6 is connected to a public switched telephone network (PSTN) 8 and may be connected to other MTSO's (illustrated by dotted line). The MTSO 6 controls the operation of the connected radio base stations 4 within the wireless communications system 2, such as setting up calls and coordinating the activities of the radio base stations 4. In addition, the MTSO 6 acts as switch to direct calls to and from the proper radio base station 4. The other MTSO's similarly control other radio base stations.

The wireless communications system of FIG. 1 has only a limited band of allowed frequency usage. To efficiently use this limited band, the geographical service area of the system is divided into a plurality of cells C1 through C6, with each cell assigned a set of channels in the allowed frequency band. Each set of channels is reused every k number of cells so that adjacent cells are assigned a set of disjoint channels to prevent interference. The set of channels for each cell includes both control channels and traffic channels. The traffic channels carry voice or data communication s and may be either analog or digital depending on the particular implementation of the wireless communication system. The control channels may also be either digital or analog and are used to provide information to and from the radio base stations 4 and the mobile stations 10 and control various functions of the mobile station 10. For example, the control channels are used to identify the particular cell in which the mobile is located, process a subscriber-originated call process, subscriber registration, and control other system processes.

As the mobile station moves from cell to cell, the mobile station 10 performs measurements of channels in neighboring cells while on a control channel to determine the best server. For digital control channels, the mobile station 10 measures bit error rate (BER) or word error rate (WER) or signal strength measurements in decibels. For analog control channels, measurements of signal strength in decibels are performed. If capable, the mobile station 10 may select either analog or digital control channels. In the control channel selection or reselection process, the radio base station 4 transmits a neighbor cell list of analog or digital control channels to the mobile station 10. The neighbor cell list includes information regarding control channels in neighboring cells for the mobile station to measure with regards to the control channel selection and reselection procedures.

If a call is in progress, new traffic channels are assigned to the mobile station 10 by the MTSO 6, called a handoff, without interruption of service. The mobile station 10 assists in the determination of traffic channel assignments by the MTSO 6 at handoff by measuring the signal strength of traffic channels in neighboring cells and reporting the data to the MTSO 6. This process is called mobile assisted hand-off (MAHO).

In a digital wireless communications system, such as systems described by EIA/TIA-IS-136 standard or IS-54-B standard, while on a traffic channel, a mobile station 10 is actively transmitting and receiving less than two-thirds of the time. During the idle time periods, a mobile station 10 is able to perform scanning and measuring operations in order to measure the quality of channels in neighboring cells. For digital traffic channels, signal strength measurements such as the bit error rate (BER) or word error rate (WER), while signal strength measurements in decibels are performed by the mobile station for analog and digital channels.

To initiate radio measurements by the mobile station 10 while on a traffic channel, the radio base station 4 transmits a measurement order to the mobile station 10. The measurement order includes a set of channels for the mobile station 10 to measure. During an idle period when the mobile station 10 is not otherwise transmitting or receiving traffic on the traffic channel, the mobile station 10 performs the measurements of the set of channels in the measurement order. The mobile station 10 generates a report of the performed measurements and transmits the report back to the radio base station 4. The MTSO 6 uses the report, among other things, to determine the channel assignments for the mobile station 10.

A conventional, prior art mobile station 10 is shown in FIG. 2. The mobile station 10 includes a controller 12 which controls the functions of the mobile station 10. The controller 12 typically includes a central processing unit (CPU) (not shown), memory (not shown), and I/O ports (not shown). The controller 12 processes voice or data signals to and from a transceiver 14. The transceiver 14 converts a voice or data signal from the controller 12 to a radio wave and also detects and demodulates a received radio wave into a voice or data signal. The transceiver 14 is connected to an antenna 16 for radio transmission and reception of radio waves.

The controller 12 is also connected to a microphone 18, speaker 20 and user interface 22. The microphone 18 includes a dynamic microphone, condenser microphone, or the like to transduce a user's voice into an electrical signal. An analog to digital converter (ADC) (not shown) convenes the electrical signal into a digital voice signal. The speaker 20 outputs a received voice signal, and typically includes a digital-to-analog converter (DAC) (not shown) and amplifier (not shown). The user interface 22 includes a display, such as an LED or LCD, and a keypad or other controls. A rechargeable battery 24 provides power to the mobile station 10.

A synthesizer 26 is connected to the controller 12 and transceiver 14. The synthesizer 26 generates signals at variable frequencies in response to an input frequency value from the controller 12. The generated signals are communicated to the transceiver 14 for reception or transmission of a channel about that frequency. The synthesizer 26 is includes a phase detector 28, loop filter 30, and voltage controlled oscillator (VCO) 32. A reference crystal 34 is connected to the synthesizer 26 and generates a reference signal 35 at a set frequency $f_r$. The controller 12 controls the frequency output of the synthesizer 26 by transmitting a channel data signal 11 to the synthesizer 26 to store a divisor N value in a Divide-by-N Register 36. The controller 12 then transmits a control signal 13 to the synthesizer 26 to latch the divisor N value. In response, a frequency $f_o$ of output signal 33 from the VCO 32 is divided by N. The phase detector 28 compares the phases of the output signal 37 of the Divide-by N Register 36 and the reference signal 35 from reference crystal 34 to generate an error voltage ($V_e$) signal 29 proportional to the phase difference between the two signals. The loop filter 30 is a low pass filter that filters the voltage error $V_e$ signal 29 prior to inputting the signal to the VCO 32. The frequency $f_o$ of the output signal 33 of the VCO 32 stabilizes to $f_o = N*f_r$ and is transmitted to the transceiver 14.

The conventional operation of the mobile station 10 of FIG. 2 during a measurement operation of a set of channels is now discussed in reference to FIG. 3. In step 38, the mobile station 10 receives a measurement order or a neighbor cell list from the radio base station 4 over a traffic or control channel. The controller 12 waits until the next idle state to perform measurements of the channels designated, as shown in step 39. During the next idle period, the controller 12 determines the number of channels to measure, as shown in step 40. In step 42, the controller 12 stores data for the first channel to be measured in the Divide-by-N Register 36 of the synthesizer 26 and transmits a "latch new channel data" signal 13 to the synthesizer 26 in step 43. In response, the synthesizer 26 generates a VCO output signal 33 at a frequency $f_o$ specified by the channel data in the Divide-by-N Register 36. The VCO output signal 33 is communicated to the transceiver 14 which then receives a measurement command 15 from the controller 12 in step 44. The transceiver 14 measures the signal strength of the first channel and transmits a measured signal strength data signal 17 to the controller 12, as shown in step 46.

The controller 12 receives the measured signal strength data, as depicted in step 48, and decrements the number of channels to measure, as shown in step 50. The controller 12 determines if additional channels are to be measured in step 52. If no more channels are to be measured, the controller 12 again enters an idle period and is ready to transmit or receive on a traffic channel or an active state, as shown in step 54. Otherwise, the process returns to step 42, and the controller 12 loads the channel data for the next channel to be measured into the synthesizer 26. If there is not sufficient time to complete the measurements during the idle period between transmitting or receiving, the mobile station 10 must wait until the next idle period to continue the measurements.

This conventional process of measuring the signal strength of a set of channels requires much interaction by the controller 12. The controller 12 must individually store channel data for each channel to be measured in the synthesizer 26, transmit a latch data signal to the synthesizer 26, and initiate measurement by the transceiver 14 for each channel. As a result, this process requires valuable time and overhead by the controller 12.

The measuring operation in a mobile station needs to be performed quickly and efficiently, especially when a mobile station is measuring channels during an idle period, since there is limited time to perform the operation. A need has thus arisen in the industry for a more efficient method and apparatus to measure varying sets of channels by a mobile station.

SUMMARY OF THE INVENTION

The invention is directed to a mobile station in a wireless communications system. The wireless communications system includes at least one mobile station that interfaces with a radio base station, wherein the radio base station transmits a measurement order or neighbor cell list that includes a set of channels to be measured by the mobile station. The mobile station includes a controller for processing the set of channels in the measurement order or neighbor cell list and a synthesizer. The synthesizer includes a memory for storing the channel data corresponding to the set of channels, a timing sequencer for automatically selecting channel data for each channel in the set of channels with control interaction; and a phase locked loop for generating a frequency signal corresponding to the selected channel data. The mobile station also includes a transceiver for measuring signal strength data corresponding to the generated frequency signal of the synthesizer. The timing sequencer of the synthesizer includes an output control signal for selection of channel data for each channel in the set of channels, and an output measure signal, wherein the transceiver measures the signal strength data corresponding to the generated frequency signal of the synthesizer in response to the output measure signal.

In operation, the controller of the mobile station stores channel data for a set of channels into the memory of the synthesizer. For each channel in the set of channels stored in the memory of the synthesizer, the synthesizer automatically selects channel data for the channel and generates a frequency signal corresponding to the selected channel. The transceiver measures signal strength data of the selected channel responsive to the frequency signal. In addition, the transceiver may buffer the signal strength data for the set of channels and transmit the signal strength data for the entire set of channels to the controller upon completion of measuring the signal strength data for the set of channels.

BRIEF DESCRIPTION OF THE DRAWINGS

For a more complete understanding of the present invention and for further objects and advantages thereof, reference may now be had to the following description taken in conjunction with the accompanying drawings, in which like numerals are used for similar parts.

DETAILED DESCRIPTION OF THE INVENTION

Figure 1:
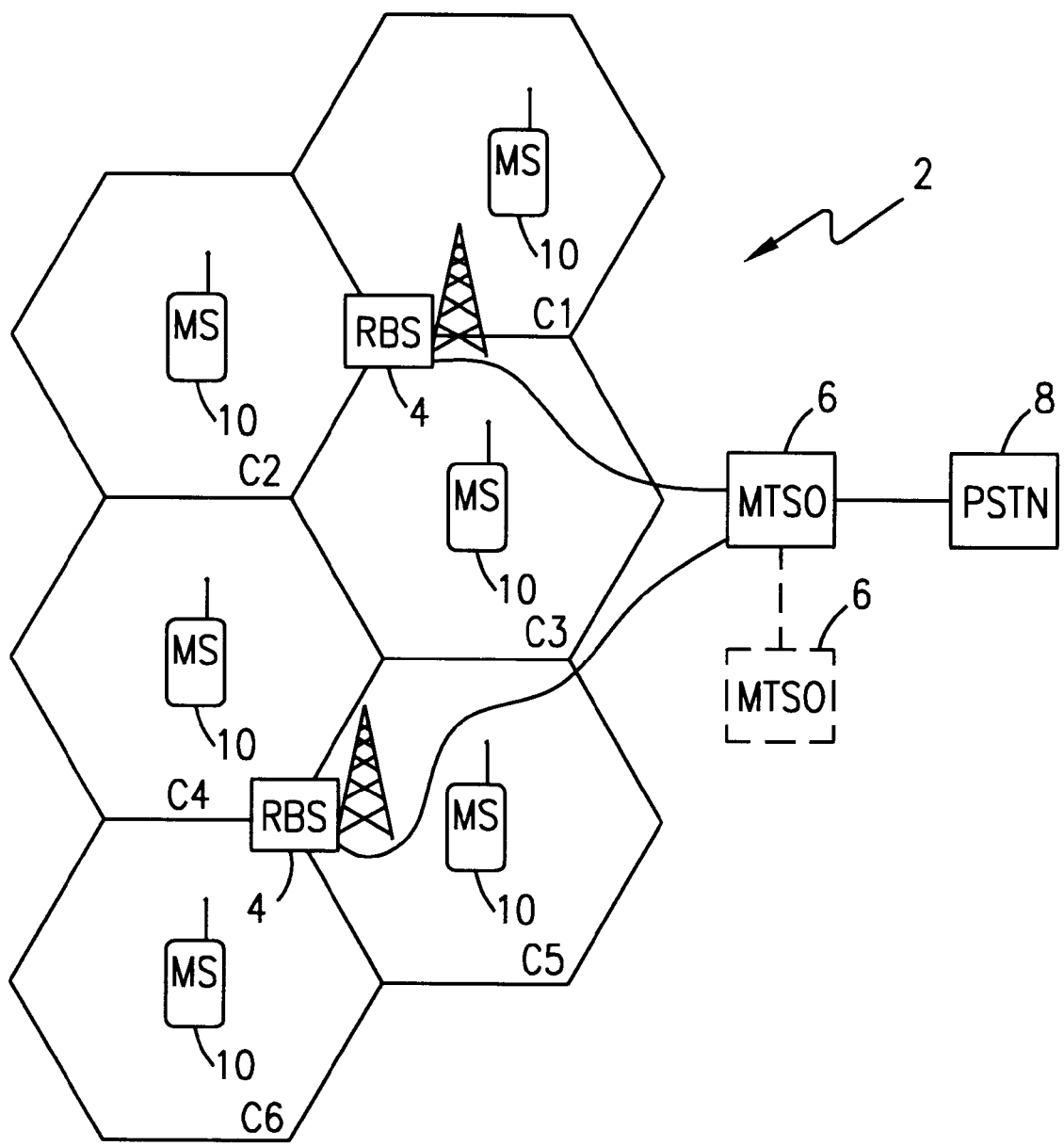
FIG. 1 illustrates a wireless communications system in which the present invention may be incorporated.
Figure 2:
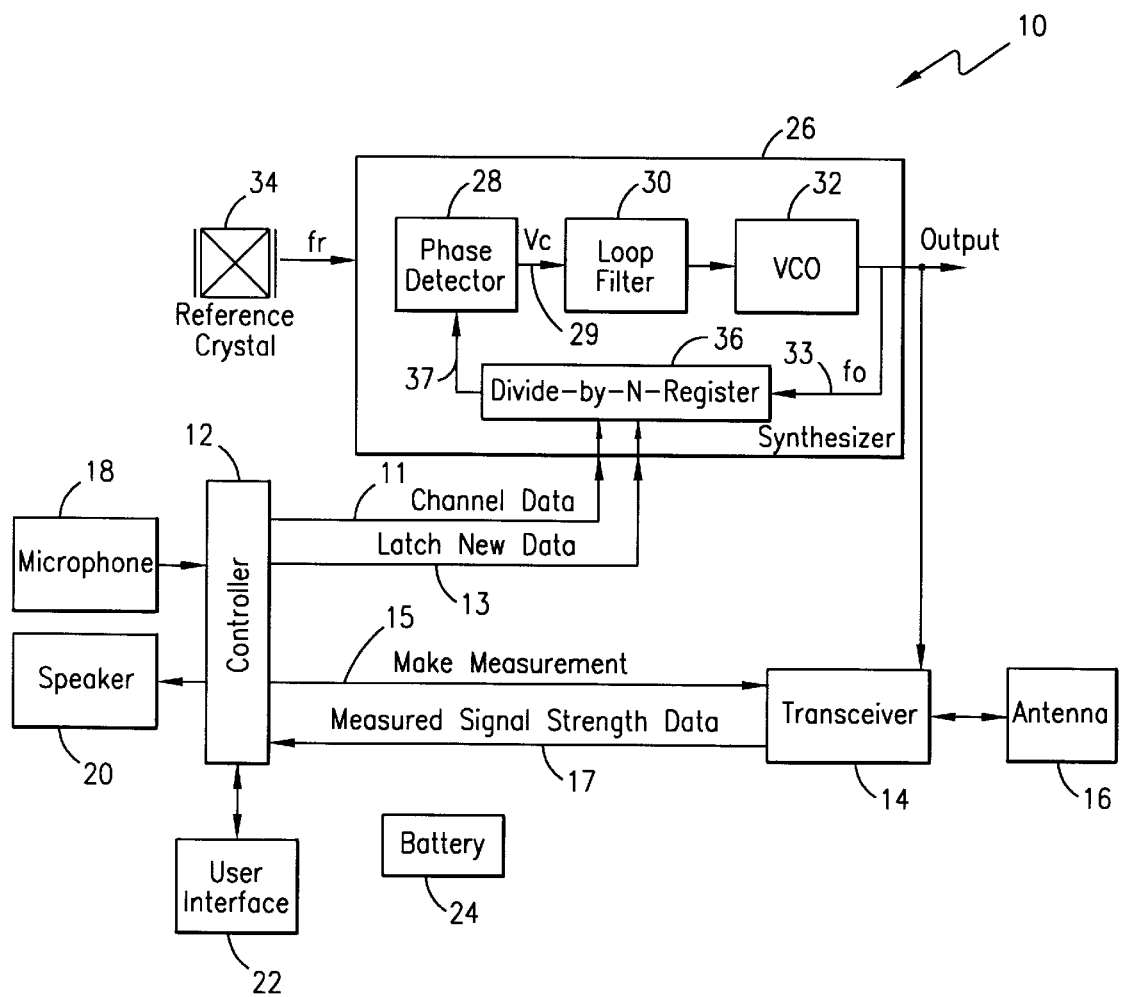
FIG. 2 illustrates a prior art block diagram of a conventional mobile station.
Figure 4:
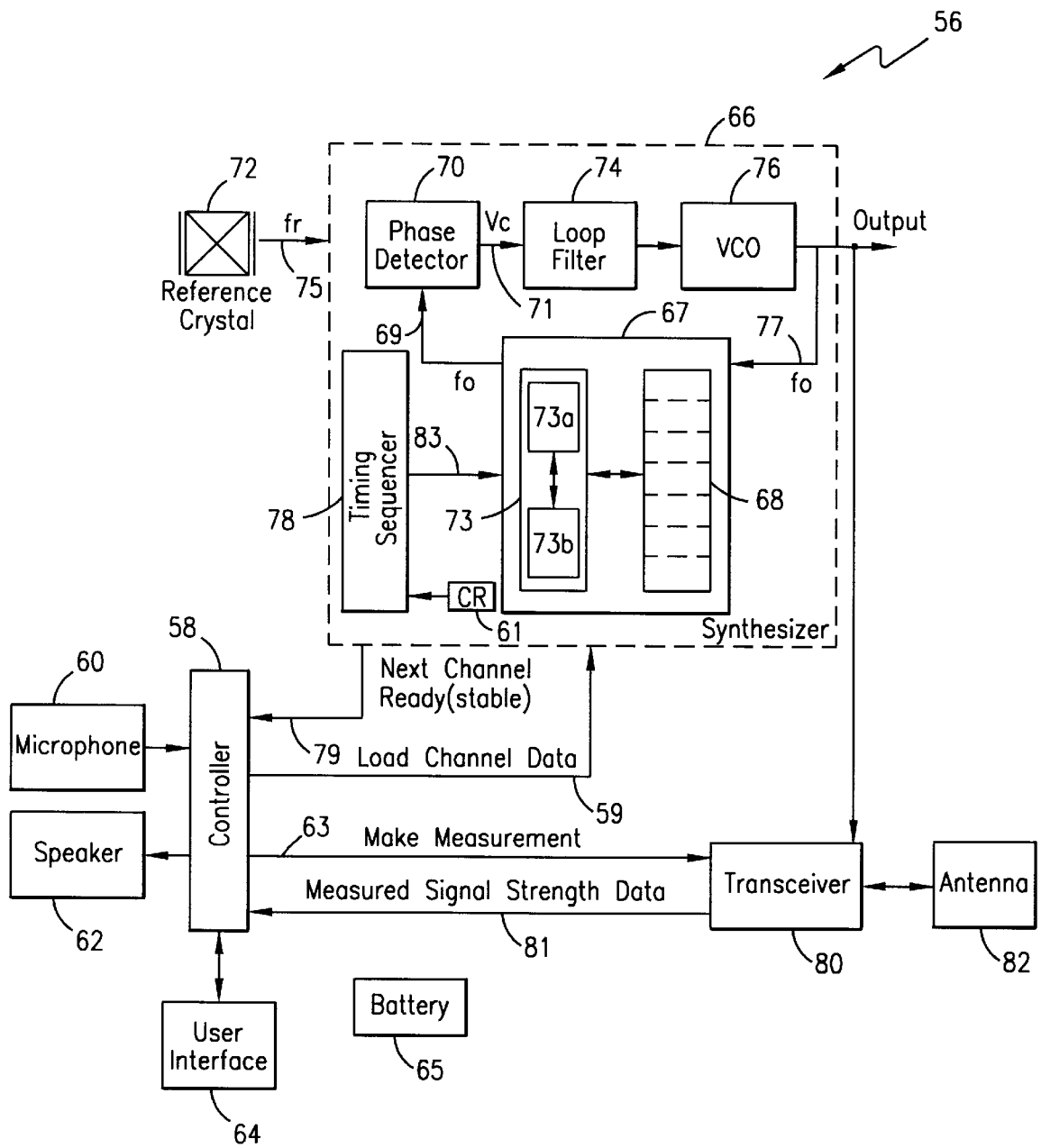
FIG. 4 illustrates a block diagram of a mobile station which incorporates the present invention.

In FIG. 4, a mobile station 56 incorporating the present invention is shown. The mobile station 56 may be any type of mobile station suitable for operation in a wireless communications system as defined by various air interface standards such as EIA/TIA IS-136 Based Air Interface Compatibility 1900 MHZ Standard. The mobile station 56 includes a controller 58 which controls the functionality and operation of the mobile station 56. Similar to the mobile station 10 in FIG. 2, the mobile station 56 includes a microphone 50, speaker 62 and user interface 64. A battery 65 is the power source for the mobile station 56.

The mobile station 56 of the present invention also includes a synthesizer 66 having a signal divider block 67, a command register 61 and timing sequencer 78. The signal divider block 67 includes a channel data register block 68, preferably a plurality of registers, for storing channel data for a set of channels. The register block 68 is a read/write memory which may be reloaded with channel data for varying sets of channels. The channel data stored in register block 68 may be a divisor N, or the channel data may include an actual frequency value f for a channel (whereby the synthesizer 66 calculates N) depending on the type of synthesizer implemented in the mobile station 56.

The signal divider block 68 also includes a divisor circuit 73 which includes components necessary to perform division of a signal in accordance with the channel data stored in memory 68a. For example, the divisor circuit 73 may include a programmable counter 73a and a coincidence circuit 73b that compares the count output from the programmable counter 73a with the stored channel data from the register block 68. The coincidence circuit 73b provides a pulse whenever coincidence of the count output of the programmable counter 73a and the stored channel data from the register block 68 is achieved and simultaneously provides a reset pulse to the programmable counter 73a to reset the same. As a result, an output of the signal divider block 69 has a frequency corresponding to the stored channel data.

The divided signal output 69 of the signal divider block 67 is an input to a phase detector 70, which compares a phase of the divided signal output 69 with a phase of reference crystal 72. The reference crystal 72 provides an output signal 75 at a constant frequency $f_r$. The output signal 71 of the phase detector 70 is an error voltage ($V_e$) signal proportional to the difference in phase of the two input signals. The error voltage $V_e$ signal 71 is inputted to a loop filter 74.

The loop filter 74 is preferably a low pass filter to pass a DC error voltage $V_e$ signal to VCO 76. In response to the error voltage $V_e$ signal, the VCO 76 outputs a signal 77 with a frequency $f_o$ equal to $N.f_r$. Thus, when stabilized, the VCO output signal 77 has a frequency $f_o$ corresponding to the channel data of the selected register in the register block 68. The synthesizer 66 transmits the VCO output signal 77 to the transceiver 80 which transmits or receives data and voice signals in the channel with center frequency $f_o$.

The VCO output signal 77 is also fed back through signal divider block 68 to trigger the programmable counter 73, and thus, form a feedback loop. A timing sequencer 78 controls the input of channel data from the block register 68. The timing sequencer 78 includes a programmable counter and output control signals to select a register of channel data in the register block 68. The synthesizer is shown in dashed lines to indicate that the individual parts may not be located within the same chip. For example, the VCO 76 is preferably a separate chip from the loop filter 74 and phase detector 70 such that the required sensitivity may be obtained.

The timing sequencer 78 and command register 61 of the synthesizer 66 control the various operations of the synthesizer 66. The timing sequencer 78 controls the timing of the selection of the channel data while the command register 61 communicates instructions from the controller to the timing sequencer 78 and other components of the synthesizer 66.

Figure 5:
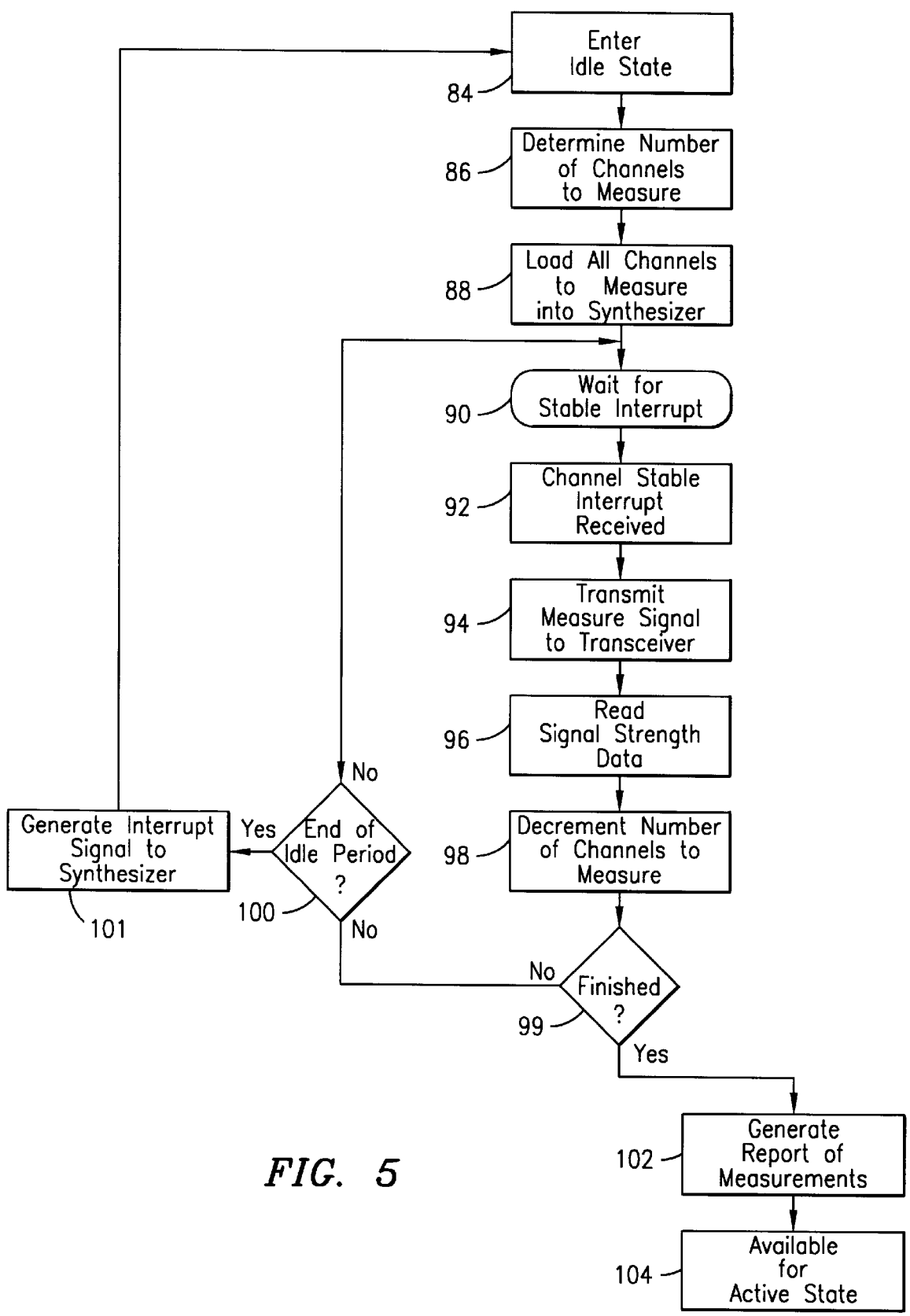
FIG. 5 illustrates a flow chart of the operation of a controller in the mobile station of the present invention.
Figure 6:
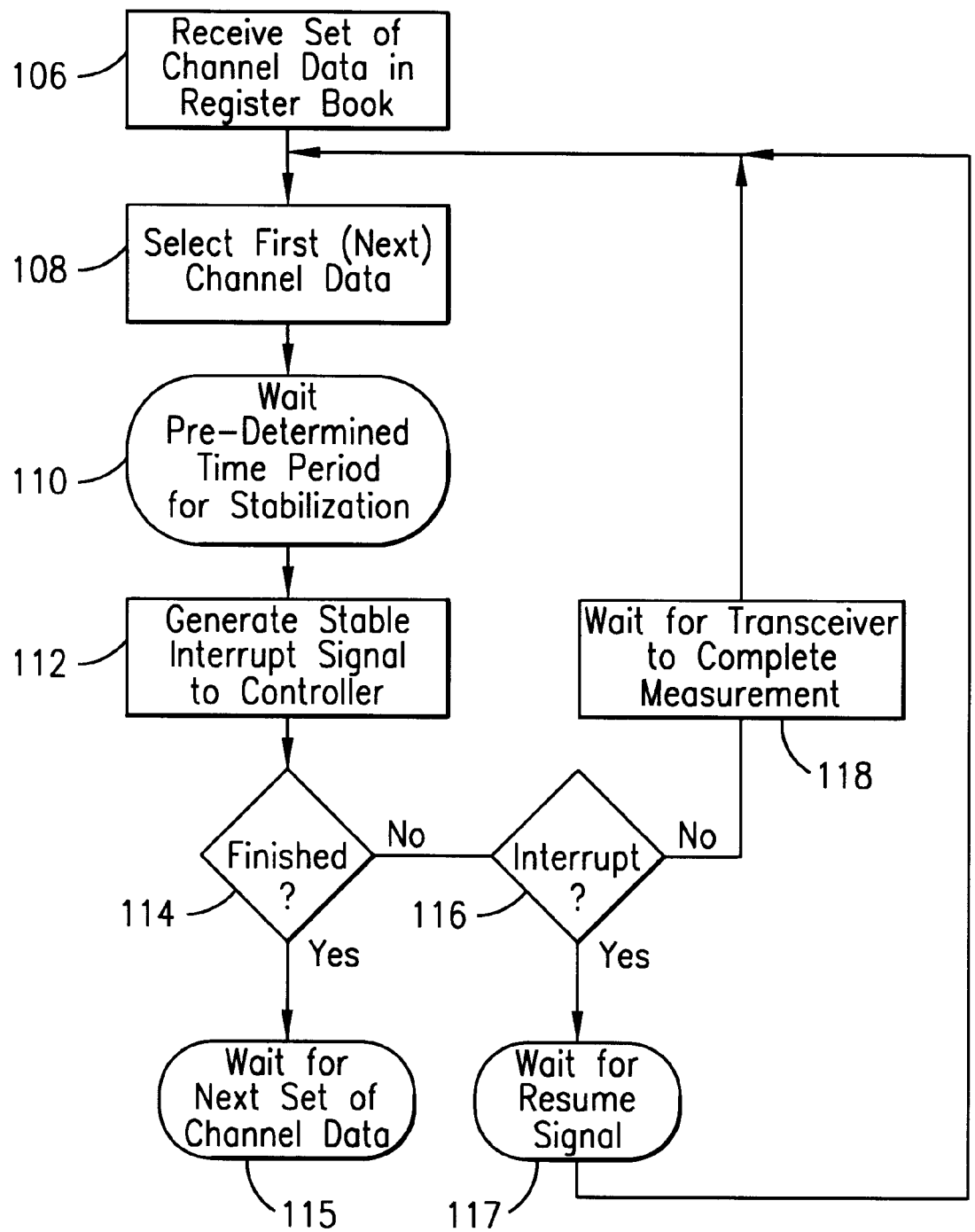
FIG. 6 illustrates a flow chart of the operation of a synthesizer in the mobile station of the present invention.

The operation of the mobile station 56 during the scanning and measuring of a set of channels is now explained with reference to FIGS. 5 and 6. In FIG. 5, the operation of the controller 58 is explained while the operation of the synthesizer 66 is explained in more detail with reference to FIG. 6. In the embodiments of FIG. 5 or 6, the mobile station 10 performs measurements of a set of channels during a call process, such as in response to a neighbor cell list or measurement order. A person of skill in the art would appreciate that this invention would be applicable and advantageous during any call process when the mobile station 10 must measure a set of channels.

In FIG. 5, the mobile station 10 is on a traffic channel during a call when the radio base station 12 transmits a measurement order or a neighbor cell list that includes a set of channels to the mobile station 56 over a traffic or control channel. The set of channels to measure will vary depending on the geographical location of the mobile station 56 and the channel allocations for the wireless communications system. In step 84 of FIG. 5, the mobile station 56 enters in idle period. For example, when on a traffic channel, the mobile station enters an idle period when not transmitting or receiving on a traffic channel and will leave the idle period in order to transmit or receive voice or data traffic. When on a control channel, the mobile station 56 enters an idle period or camping state when not performing functions, and will leave the idle period in order to process various functions or orders, such as a subscriber-originated call. In response to entering an idle period, the controller 58 determines the number of channels in the set of channels to measure, as shown in step 86. The set of channels may include one, two or more channels depending on the measurement operation.

The controller 58 then loads the channel data for the set of channels in the register block 68 of the signal divider block 67 in step 88. The loading operation may be a write operation to an I/O port address of the register block 68, as is well known in the art. If the idle period is of a known duration, such as the duration between paging channels, the controller 58 may determine the number of channels that can typically be measured during the known duration and only load that number of the set of channels into the register block 68. Otherwise, for example if the idle period is of an unknown duration, such as in a camping state, the controller 58 may load the entire set of channels into the register block 68 and transmit an interrupt command to the command register 61 in the synthesizer 66 when another function needs to be performed.

Once the channel data is loaded in the register block 68, the timing sequencer 78 initiates synthesis of a frequency signal corresponding to channel data in a register of register block 68. The timing sequencer 78 automatically transmits a channel select signal 83 that selects channel data of a first register in the register block 68 as an input to the divisor circuit 73 without controller interaction such as a latch channel data signal or other control signal from the controller 58. The timing sequencer 78 waits a predetermined period of time for the synthesizer 66 to output a stable VCO output signal 77 corresponding to the selected channel data, as shown in step 90. Then, the timing sequencer 78 generates a stable interrupt signal 79 that is transmitted to the controller 58, as shown in step 92.

In response to receiving the stable interrupt signal, the controller 58 generates a make measurement signal 63 to the transceiver 80 in step 94. In response to the make measurement signal, the transceiver 80 measures the signal strength of the selected channel corresponding to the frequency of the VCO output 77. The transceiver 80 transmits the measured signal strength data to the controller 58 for the selected channel data in step 96. The controller 58 decrements the number of channels to measure in step 98.

In step 99, the controller 58 determines whether signal strength data has been collected for all the channels that were loaded into the register block 68 in the previous step 88. If all the signal strength data has been collected, the controller 58 generates a measurement report to the radio base station 4 of the measurement results in step 102. The mobile station 56 then becomes available for an active state, as shown in step 104.

If the mobile station 56 has not completed measuring signal strength data for the set of channels loaded into the register block 68, but the idle period is complete, the mobile station 56 stops the measurements by transmitting an interrupt signal to the command register 61, as shown in step 101. The mobile station 56 transmits or receives as required and completes the measurement process during the next idle period or periods as needed. During the next idle period, the controller 58 may generate a resume signal to the command register 61 to continue measuring the remaining channels in the register block 68 rather than reloading the channels.

In the above process, the controller 58 needs to load channel data only once at the start of the measuring operation. The controller 58 loads the channel data for the entire set of channels into the register block 68 rather than loading the channel data for one channel at a time. This saves the controller 58 from performing multiple I/O writes which generally consume much processor time.

The operation of the synthesizer 66 during the measuring operation of FIG. 5 is now described in more detail with respect to FIG. 6. In step 106, the synthesizer 66 receives a set of channel data from the controller 58 and stores the channel data in register block 68 located in the signal divider block 67. The channel data received from the controller 58 may include a set of N values wherein the frequency $f_o$ of the VCO output signal 77 equals $f_o=N*f_r$. Each register in the register block 68 includes a separate N value corresponding to a channel to be measured. Alternatively, depending on the type of synthesizer implemented, the channel data may comprise actual frequency values for a set of channels which the synthesizer 66 converts to N values for each channel.

Once the channel data is loaded into the register block 68, the timing sequencer 78 automatically selects channel data from a first register in the register block 68, as shown in step 108, without controller interaction such as a latch or other control signal from the controller 58. The timing sequencer 78 waits a predetermined period of time for the VCO output signal 77 to stabilize to a frequency corresponding to the selected channel data, as shown in step 110. The predetermined period of time may vary depending on the PLL used to implement the synthesizer 66 and the selected frequency. Once stabilized, the timing sequencer 78 generates a stable interrupt signal 79 which is transmitted to the controller 58 as shown in step 112. The stable interrupt signal 79 notifies the controller 58 that the transceiver 80 may now take a measurement.

In step 114, the timing sequencer 78 determines if all the registers in register block 68 containing channel data have been selected. If so, the synthesizer 66 waits for the next set of channel data from the controller 58 or other command as shown in step 115. If additional channels exist, the timing sequencer 78 determines if an interrupt signal has been received from the controller 58 in step 116. If not, the timing sequencer 78 waits a pre-determined time period for the transceiver 80 to complete its current measurement in step 118. Alternatively, the transceiver 80 may signal the synthesizer 66 that the measurements are complete. The process then returns to step 108, and the timing sequencer 78 automatically selects the next register of channel data, without controller interaction such as a control or latch new data signal from the controller 58 in step 116. If the synthesizer 66 receives an interrupt signal from the controller 58, the timing sequencer 78 selects no more channels and waits for a resume signal from the controller 58 or for the controller 58 to load a new set of channels into the register block 68, as shown in step 117.

Figure 3:
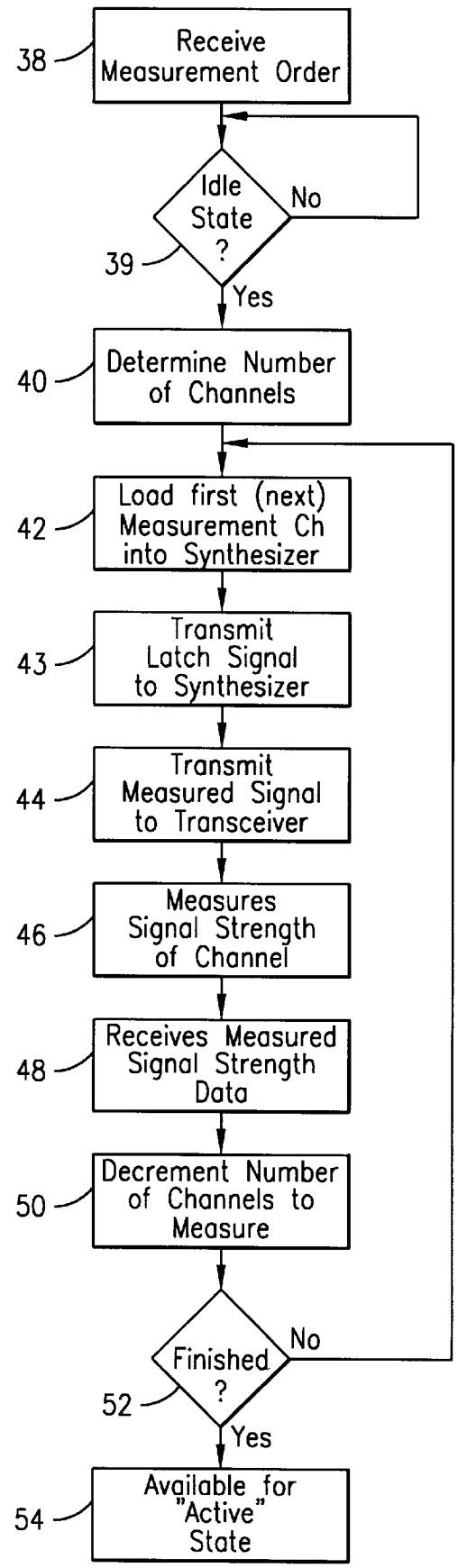
FIG. 3 illustrates a prior art flow chart of a conventional process for measuring control channels by a mobile station.

Thus, as described in the measuring operation of FIG. 5, the controller needs to load channel data only once for an entire set of channels into the register block 68 rather than individually loading channel data for each channel. The timing sequencer 78 automatically selects channel data for each channel in the set of channels without a latch new data or other control signal from the controller 58. Consequently, the necessary interaction of the controller 58 is reduced from the conventional method of FIG. 3. This reduced controller interaction which increases the efficiency and speed of the measuring operation.

Figure 7:
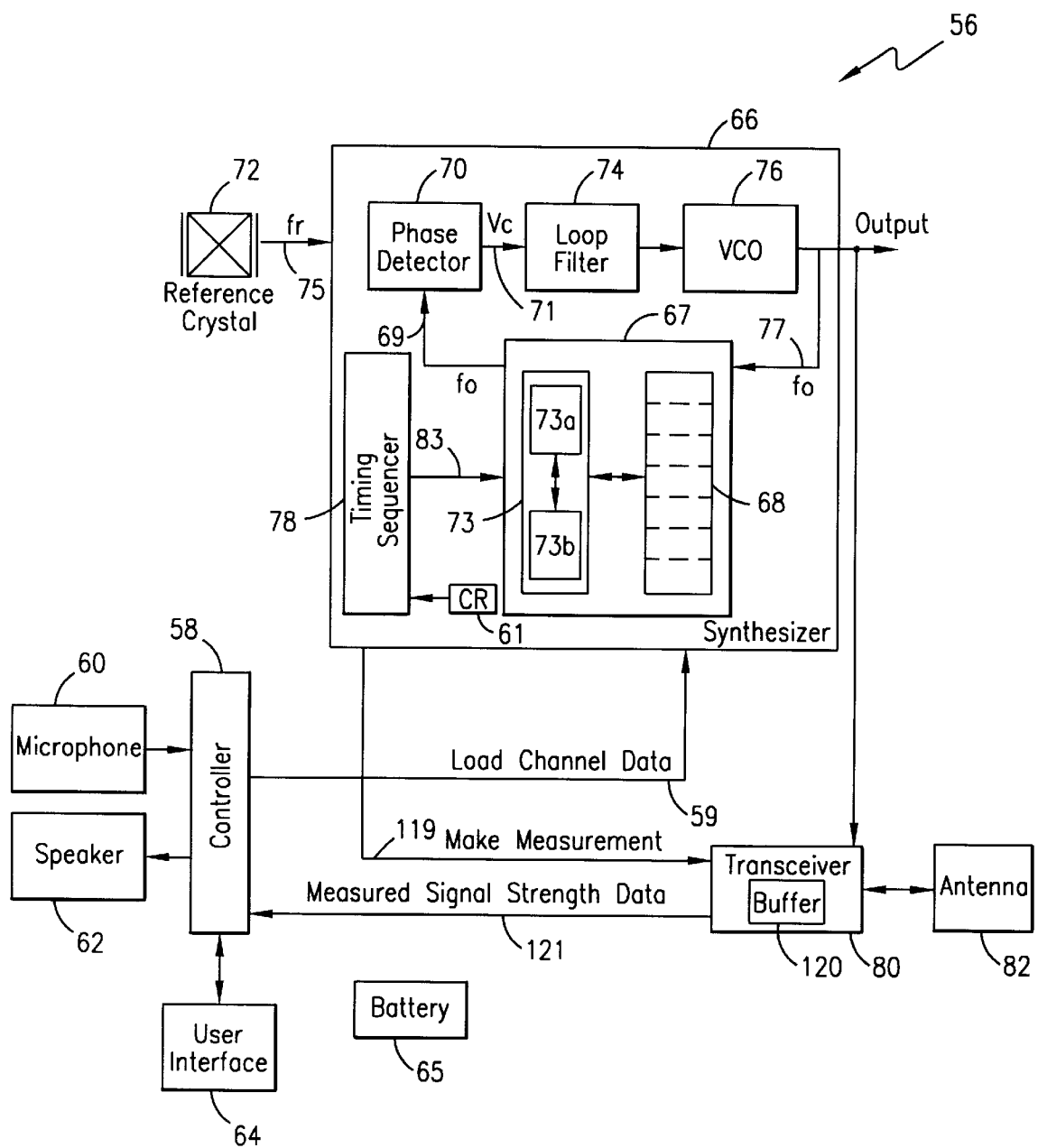
FIG. 7 illustrates a block diagram of an alternate embodiment of the mobile station of the present invention.

A second embodiment of the mobile station 56 is shown in FIG. 7. In this embodiment, the transceiver 80 of mobile station 56 includes a buffer 120 for storing measured signal strength data. In addition, the synthesizer 66 outputs a make measurement signal 119 to the transceiver 80 rather than a stable interrupt signal 77 to the controller 58. The operation of the second embodiment of mobile station 56 is described with reference to FIGS. 8 and 9.

Figure 8:
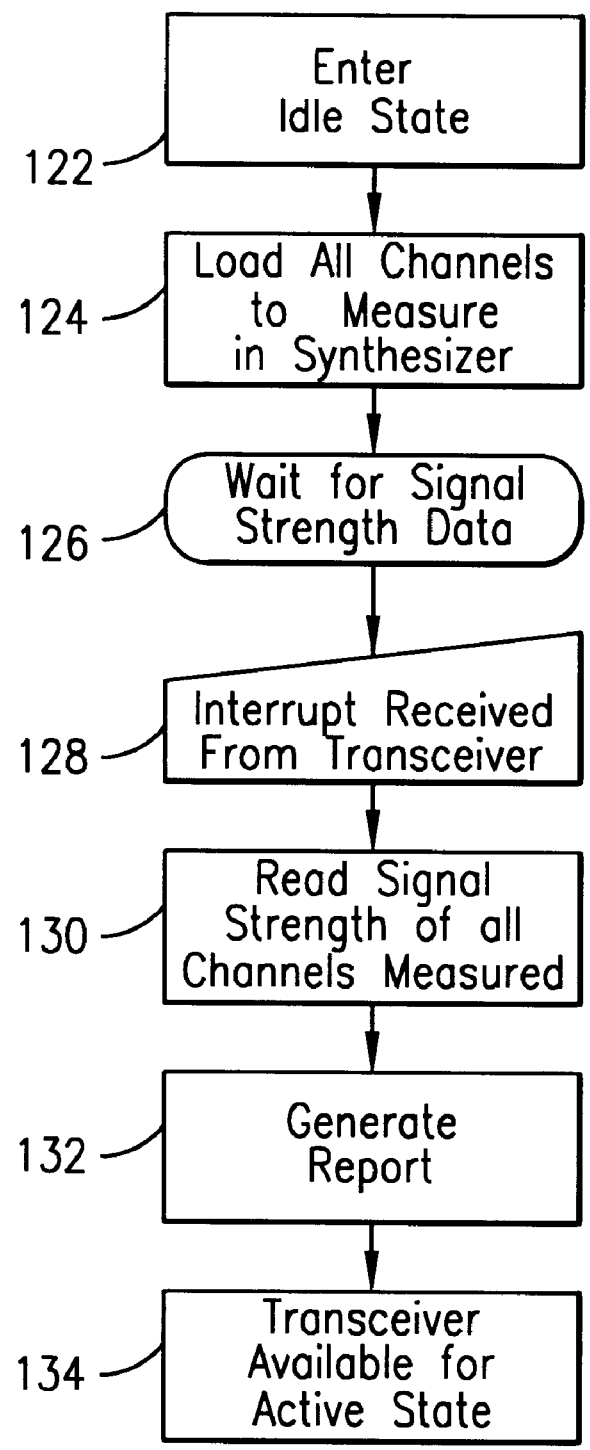
FIG. 8 illustrates a flow chart of the operation of the alternate embodiment of the mobile station of the present invention.

FIG. 8 illustrates a flow chart of the operation of the controller 58 in FIG. 7. In the example of FIG. 8, the radio base station 12 transmits a neighbor cell list or measurement order to the mobile station 56 with a set of channels to measure. Again, a person of skill in the art would appreciate that the present invention may be advantageous to measure a set of channels during other operations. In step 122, the mobile station 123 enters in an idle period. In response to entering the idle period, the mobile station 56 performs measurements of the channels in the received neighbor cell list or measurement order. The controller 58 performs an I/O write operation to the register block 68 in order to store channel data for the set of channels, as shown in step 124. Again, if the duration of the idle period is known, the controller 58 may only load a subset of the channels to the register block that may measured in the allotted period. In step 126, the controller 58 waits for the signal strength data from the transceiver 80. The controller 58 may transmit an interrupt signal to the synthesizer 68 if the idle period elapses prior to completion of the measurements.

While the controller performs other operations or waits, the transceiver 80 measures the signal strength data for each channel (as explained in more detail with reference to FIG. 9) and buffers the signal strength data in buffer 120. Once the signal strength data for the entire set of channels has been measured and buffered in buffer 120, the transceiver 80 sends an interrupt signal 121 to the controller, as shown in step 128. The controller 58 may access the buffer 120 at the address indicated in the interrupt signal 121 to read the signal strength data of all the channels, as shown in step 130. Alternatively, the transceiver 80 may transmit the signal strength data to the controller 58 as part of the interrupt signal 121. Thus, the controller 58 receives the signal strength data for the entire set of channels at one time. The controller 58 generates a measurement report back to the radio base station 12 as shown in step 132 and is ready for an active state, shown in step 134.

Figure 9:
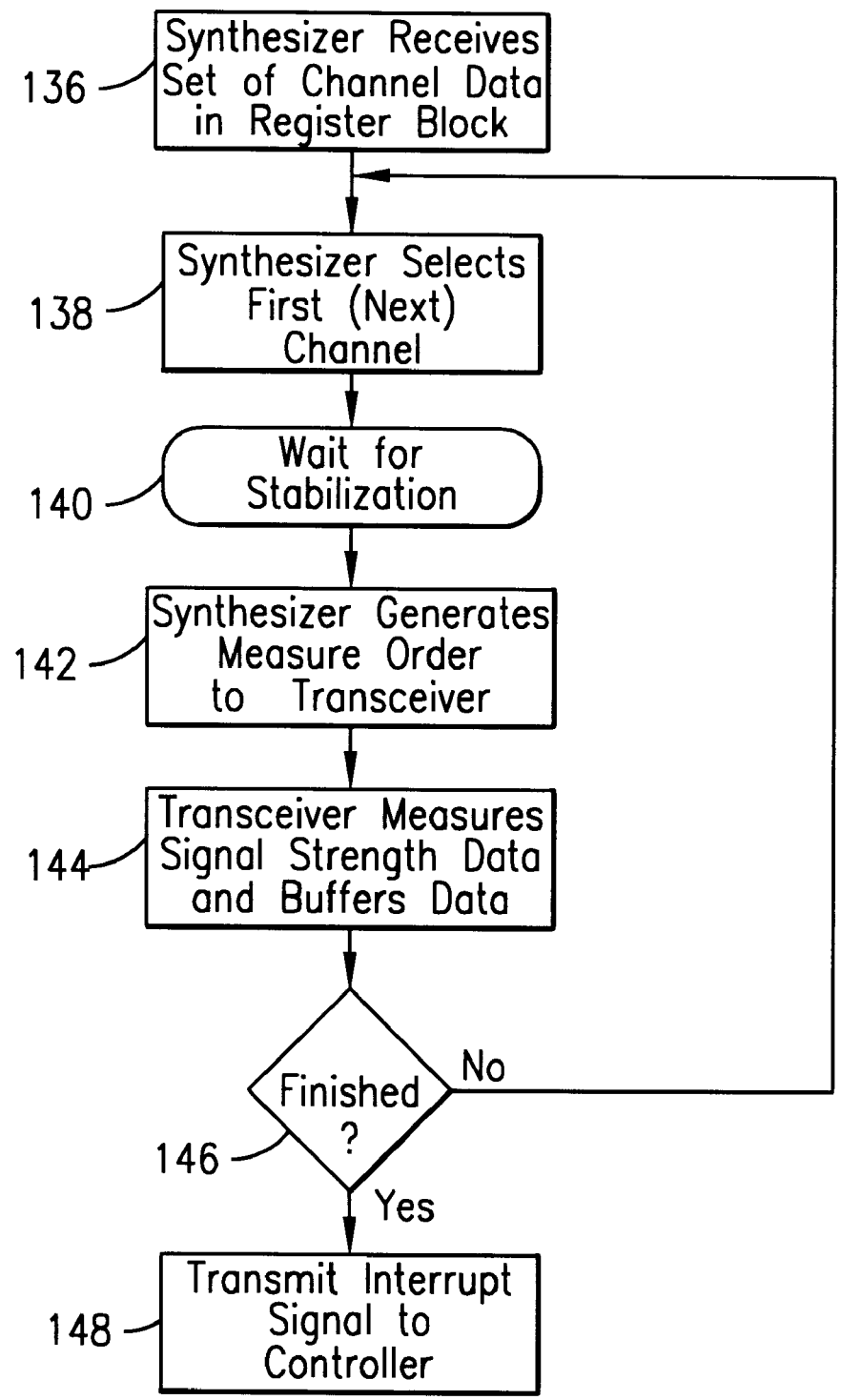
FIG. 9 illustrates a flow chart of the operation of the alternate embodiment of the mobile station of the present invention.

The operation of the synthesizer 66 and transceiver 80 during the measuring operation of FIG. 8 is described in more detail with reference to FIG. 9. In step 136, the synthesizer 66 receives channel data for a set of channels from the controller 58 and stores the channel data in register block 68. The timing sequencer 78 automatically selects a first register of channel data in the register block 68 in step 138 without controller interaction and waits a predetermined period of time for the output 77 of the synthesizer 66 to stabilize to a frequency corresponding to the selected channel data, as shown in step 140). Once the predetermined period is complete, the timing sequencer 78 generates a make measurement signal 119 to the transceiver 80 in step 142, again without controller interaction between the synthesizer or transceiver. In the first embodiment of FIG. 4, the synthesizer 66 transmitted a stable interrupt signal 79 to the controller 58, and the controller 58 then transmitted a make measurement signal 61 to the transceiver 80. Instead, in this embodiment, the synthesizer 66 transmits a make measurement signal 119 directly to the transceiver 80 and does not generate a stable interrupt signal 79 to the controller 58.

In response to the make measurement signal 119 generated by the timing sequencer 78, the transceiver 80 measures the signal strength of the selected channel. The transceiver 80 stores the signal strength data in the buffer 120, as shown in step 144. The transceiver 80 then waits for another make measurement signal 119 from the synthesizer 66. The timing sequencer 78 determines whether all registers of channel data in the register block 68 have been selected in step 146. If not, the process returns to step 138, and the timing sequencer 78 automatically selects the next register of channel data. Alternatively, if the synthesizer 66 receives an interrupt signal from the controller 58, then the timing sequencer 78 will not select another channel until a resume signal is received or another set of channels is loaded into the register block 68. If no more measurements need to be performed, the transceiver 80 sends an interrupt signal 121 to the controller 58 with the measured signal strength data for the entire set of channels.

The embodiment of FIG. 7 requires even less controller interaction than the embodiment of FIG. 4. Once channel data for a set of channels is loaded by the controller 58 into the synthesizer 66, the controller 58 only needs to wait until the transceiver 80 transmits an interrupt signal 121 to the controller 58 with the measurement data for the entire set of channels. The timing sequencer 78 automatically selects each register of channel data and generates a make measurement signal 119 which is transmitted to the transceiver 80. In response, the transceiver 80 performs the measurement and buffers the measured signal strength data, without a make measurement signal or other control signal from the controller 58. Upon completion of the measurements for the entire set of channels, the transceiver transmits the signal strength data to the controller. Alternatively, after each signal strength measurement, the transceiver 80 may send an interrupt signal to the controller 58 with the signal strength data for that channel rather than buffering the signal strength data in buffer 120.

Figure 10:
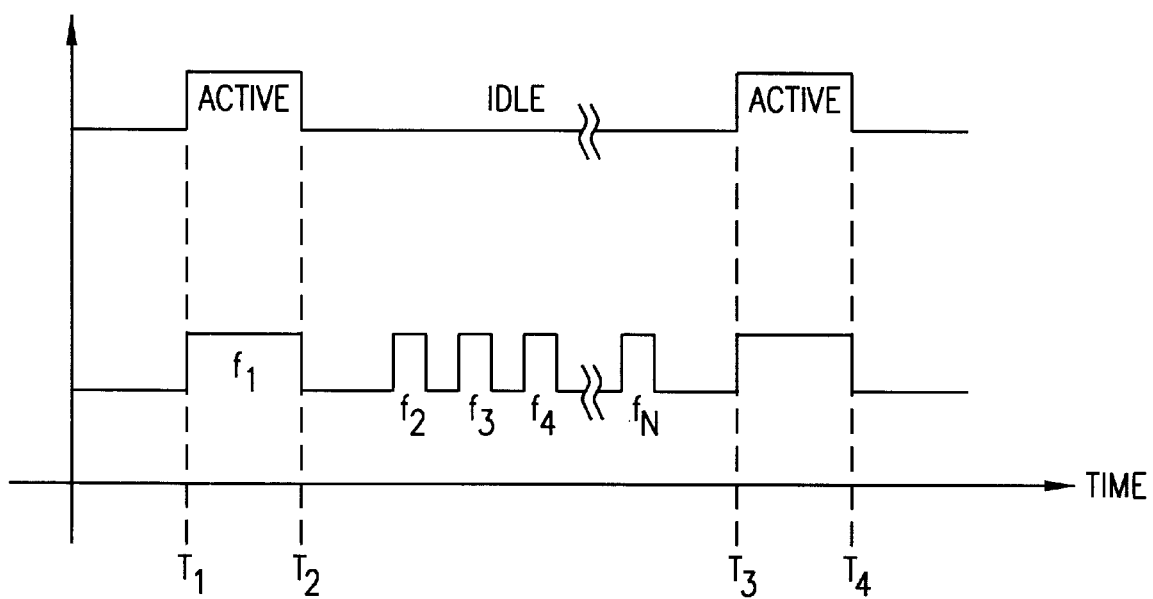
FIG. 10 illustrates a timing diagram of the operation of the present invention.

Since only a limited time exists to perform a measurement operation of a neighbor list during an idle period, the present invention is especially advantageous to reduce time and increase efficiency of this type of measuring operation. For example, FIG. 10 illustrates a timing diagram of a measuring operation in response to receiving a measurement order. Between times T1 and T2, the mobile station 56 is in an active state and transmitting or receiving traffic on a traffic channel at a frequency f1. At T2, the mobile station 56 enters an idle period until the next period of activity. If the mobile station 56 has received a measurement order to measure the signal strengths of neighboring channels f2 through fn, the mobile station 56 must perform the measurements prior to return to an active state at time T3.

The present invention reduces the overhead and time of the controller 58 by automatically performing the measurements of the signal strength of the set of channels f2 through fn. Functions performed by the controller 58 in the prior art mobile station 10 such as controller interactions to store each channel data, latch each new channel data, trigger signal strength measurements of each channel by the transceiver, and record each result as measured are eliminated in the present invention. By decreasing the time necessary to perform signal strength measurements of a set of channels, measurement orders or neighbor cell lists may be issued more often or more channels may be measured during a measurement operation. This advantage increases the likelihood that the mobile station 56 is using the clearest channels for communications with the radio base station 12.

Though the present invention is described above in the context of measuring signal strength of a set of channels in response to receiving a neighbor cell list or measurement order from the radio base station 4, the present invention is applicable whenever a set of channels needs to be scanned or measured, such as at power-up, subscriber registration and call origination. For example, at power up, the mobile station 56 scans channels for an acceptable digital or analog control channel. The mobile station 56 often scans the frequencies based on a set of predetermined probabilities of finding an acceptable control channel at certain frequencies. If the mobile station 56 finds a candidate control channel, it determines if the control channel satisfies signal strength criteria and is suitable from a service perspective. If not, the mobile station 56 continues to search for another candidate control channel. The mobile station 56 may store a set of candidate control channels in the register block 68 and perform other operations until an interrupt signal is received from the transceiver 80 with the requested signal strength data for the set of channels.

In another example, the mobile station repetitively monitors the synchronization channels (SCHs) of neighbor cells between transmission and reception bursts. The mobile station can thus compute prior to a handoff any timing advances required for neighboring synchronous cells. This speeds up the handoff process. The set of neighboring SCHs may be loaded into the register block 68 and sequentially monitored using the present invention with less controller interaction.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. A method of measuring signal strength for a set of channels, comprising the steps of:

storing channel data for a set of channels into a memory;

for each channel in the set of channels:

automatically selecting channel data for a channel without controller interaction;

generating a frequency signal corresponding to the selected channel data;

generating a stable interrupt signal to a controller in response to the step of generating the frequency signal corresponding to the selected channel data;

generating a measurement signal to a receiver in response to the stable interrupt signal; and measuring signal strength data of the channel responsive to the frequency signal.

2. The method of claim 1, further comprising the steps of:

in response to said step of measuring signal strength data of the selected channel in response to the frequency signal, transmitting an interrupt signal to the controller which contains the signal strength data of the selected channel.

3. The method of claim 1, wherein the step of measuring signal strength data comprises measuring signal strength data of the selected channel responsive to the frequency signal and the measurement signal.

4. The method of claim 3, further including the step of:

in response to the step of measuring signal strength data of the selected channel, transmitting an interrupt signal to the controller which contains the signal strength data of the selected channel.

5. The method of claim 3, further including the steps of:

for each channel in the set of channels, storing signal strength data measured for the selected channel in a buffer; and in response to measuring signal strength data of all the selected channels in the set of channels, transmitting an interrupt signal to a controller which contains the signal strength data of all the selected channels in the set of channels.

6. The method of claim 5, further including the steps of:

receiving a set of channels to be measured from a radio base station; and wherein said step of storing channel data for a set of channels into a memory of a synthesizer comprises storing channel data for the set of channels received from the radio base station into a memory of a synthesizer in a mobile station.

7. The method of claim 6, wherein said storing step is performed in response to an idle period of the mobile station.

8. The method of claim 7, further comprising the step of generating a measurement report which includes the signal strength data of all the selected channels in the set of channels.

9. A device for measuring signal strength of a set of channels, comprising:

a memory for storing channel data of varying sets of channels;

a controller for loading channel data of varying sets of channels into said memory;

a synthesizer that automatically selects channel data stored in said memory for each channel in the set of channels without controller interaction and generates a frequency signal corresponding to the selected channel data said synthesizer including:

a timing sequencer for automatically selecting channel data stored in said memory for each channel in the set of channels; and a transceiver for measuring signal strength data for each channel in the set of channels in response to the generated frequency signal of said synthesizer.

10. The device of claim 9, further including:

a buffer for storing signal strength data for the set of channels measured by said transceiver; and wherein said transceiver communicates the signal strength data for the set of channels to the controller in response to completing the signal strength data measurements for the set of channels stored in said memory.

11. The device of claim 10, wherein said memory for storing channel data of a set of channels is a register block in said synthesizer.

12. The device of claim 11, wherein said synthesizer that automatically selects channel data for each channel in the set of channels stored in said memory and generates a frequency signal corresponding to each selected channel, comprises:

a phase locked loop for generating a frequency signal corresponding to each selected channel.

13. The device of claim 12, wherein said transceiver measures signal strength data for each channel in the set of channels in response to the output measure signal.

14. The device of claim 12, wherein said timing sequencer for automatically selecting channel data for each channel in the set of channels stored in said register block, generates:

an output control signal to select a register in said register block, and an output measure signal.

15. The device of claim 14, wherein said phase locked loop for generating a frequency signal corresponding to each selected channel, comprises:

a phase detector for comparing a phase of each selected channel with a phase of reference signal and generating an error voltage signal proportional to a difference in the phases; and a voltage controlled oscillator for generating the frequency signal corresponding to the selected channel in response to the error voltage signal.

16. The device of claim 15, wherein said device is a mobile station in a wireless communications system.

17. A wireless communications system, comprising:

a radio base station;

at least one mobile station that interfaces with said radio base station, wherein said radio base station transmits a set of channels to be measured by said mobile station, and wherein said mobile station comprises:

a controller for processing the set of channels to be measured;

a synthesizer, comprising:

a memory for storing channel data for the set of channels to be measured;

a timing sequencer for automatically selecting channel data stored in said memory for each channel in the set of channels; and a phase locked loop for generating a frequency signal corresponding to the selected channel data; and a receiver for measuring signal strength data corresponding to the generated frequency signal of said synthesizer.

18. The wireless communications system of claim 17, wherein said receiver comprises a buffer for storing signal strength data for the set of channels measured by said receiver and wherein said receiver transmits the signal strength data for the entire set of channels to the controller upon completion of measuring signal strength data of each channel.

19. The wireless communications system of claim 18, wherein said timing sequencer of said synthesizer generates an output control signal for selection of channel data for each channel in the set of channels, and an output measure signal.

20. The wireless communications system of claim 17, wherein said timing sequencer of said synthesizer generates an output control signal for selection of channel data for each channel in the set of channels, and an output table signal for indicating the generation of the frequency signal corresponding to the selected channel data by the phase locked loop.

21. The wireless communications system of claim 20, wherein said controller generates an output measurement signal in response to said output stable signal, wherein said transceiver measures the signal strength data corresponding to the generated frequency signal of said synthesizer in response to said output measurement signal.

\* \* \* \* \*

UNITED STATES PATENT AND TRADEMARK OFFICE
CERTIFICATE OF CORRECTION

PATENT NO. : 5,991,622  
DATED : November 23, 1999  
INVENTOR(S) : Henry Jr.

It is certified that error appears in the above-identified patent and that said Letters Patent is hereby corrected as shown below:

Column 1,  
Line 40, replace "communication s" with -- communications --

Column 2,  
Line 48, replace "convenes" with -- converts --

Column 4,  
Line 8, replace "," with -- ; --  
Line 10, replace "with" with -- without --; and replace "control" with -- controller --

Column 5,  
Line 8, replace "50" with -- 60 --

Column 6,  
Line 23, replace "in" with -- an --

Signed and Sealed this

Eighth Day of January, 2002

Attest:

JAMES E. ROGAN  
*Attesting Officer*   *Director of the United States Patent and Trademark Office*